April 25, 1939.　　　　B. D. McINTYRE　　　　2,155,867
SWAY BAR
Filed Jan. 17, 1938

INVENTOR.
Brouwer D. McIntyre
BY
Whittemore Hulbert & Belknap
ATTORNEYS

Patented Apr. 25, 1939

2,155,867

UNITED STATES PATENT OFFICE 2,155,867

SWAY BAR

Brouwer D. McIntyre, Monroe, Mich., assignor to Monroe Auto Equipment Company, Monroe, Mich., a corporation of Michigan Application January 17, 1938, Serial No. 185,473

7 Claims. (Cl. 267—11)

This invention relates generally to stabilizing equipment for motor vehicles and refers more particularly to stabilizers of the type having a torsion bar mounted on either the sprung or unsprung assembly of the vehicle and connected to the other assembly in a manner to resist relative deflection of the suspension springs at opposite sides of the vehicles to maintain the normal plane of the body of the vehicle substantially parallel with the plane of the axle when the vehicle is turned in either direction from a straight course of travel.

In many installations of sway eliminators of the above general type, the torsion bar is mounted on the sprung weight and the opposite ends of the bar are operatively connected to the unsprung weight through the medium of links. These links are costly to manufacture due to the particular construction required to insure quiet operation over a long period of use and, in addition, consume considerable time in assembly. It is, therefore, one of the principal objects of this invention to provide a sway eliminator capable of performing the desired results at least as efficiently as the above type of assembly and rendering it possible to eliminate the links heretofore considered necessary. In accordance with this invention, the torsion bar is supported on one of the assemblies for rocking movement and is provided with laterally extending arms having the extremities thereof pivoted directly to the other assembly.

Another advantageous feature of this invention consists in the provision of a one-piece substantially U-shaped sway eliminator of the above type wherein the ends of the leg portions of the U are pivoted directly to one of the assemblies and wherein the interconnecting base section of the U is mounted on the other assembly in resilient blocks permitting the required shifting movement of the U-shaped sway eliminator by interparticle flow of the resilient material from which the blocks are formed to compensate for the different paths of travel of the arms of the U-shaped eliminator and the part of the assembly to which the ends of the arms are pivoted.

The foregoing, as well as other objects, will be made more apparent as this description proceeds, especially when considered in connection with the accompanying drawing, wherein:—

Figure 1:
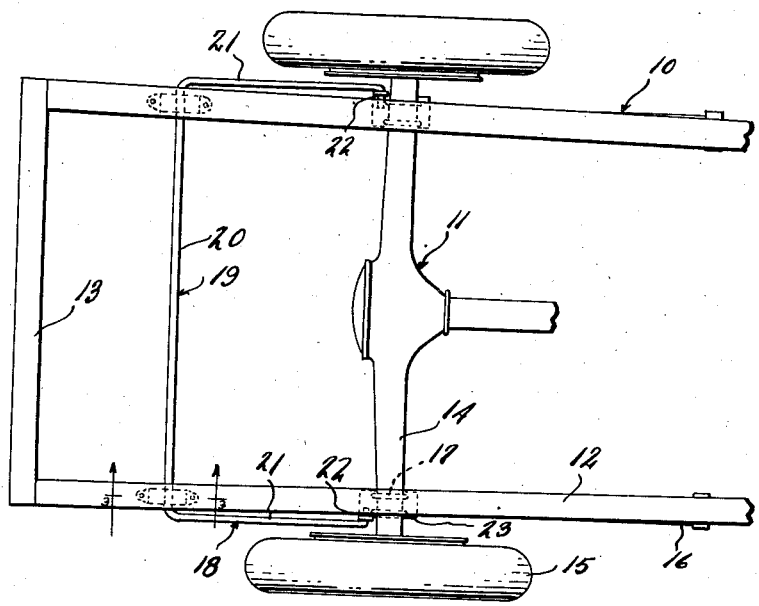
Figure 1 is a plan view of a portion of a vehicle equipped with a sway eliminator assembly constructed in accordance with this invention.

Referring now more in detail to the drawing, it will be noted that there is illustrated in Figure 1, a portion of a vehicle having a sprung assembly 10 and having an unsprung assembly 11. In the present instance, the sprung assembly comprises a frame 12 having laterally spaced longitudinally extending side sills secured in assembled relation to each other by suitable cross members, designated generally herein by the reference character 13. The unsprung assembly 11 comprises an axle 14 extending transversely of the frame 12 beneath the same and carrying road engaging wheels 15 at opposite ends thereof. Although various different types of suspension systems may be employed without departing from the spirit and scope of this invention, nevertheless, for the purpose of illustration, I have shown the sprung assembly 10 as supported from the unsprung assembly 11 by means of conventional semi-elliptical leaf springs 16 extending longitudinally of the frame 12 at opposite sides thereof. Upon reference to Figure 1, it will be noted that the free ends of the springs are suitably pivotally connected to the adjacent sill members of the frame 12 and the central portions of these springs are secured to the axle 14 by means of U-bolts 17.

In accordance with the present invention, side swaying or roll of the sprung weight of the vehicle is eliminated by maintaining the normal plane of the body of the vehicle substantially parallel with the plane of the axle when the vehicle is turned in either direction from a straight line course. For accomplishing this result, I provide means in the form of a stabilizer 18 comprising a substantially U-shaped spring steel bar 19 mounted upon one of the aforesaid assemblies with the base section 20 of the U extending transversely of the vehicle and with the side arms 21 of the U directly pivotally connected to the other assembly. Although it is immaterial insofar as the principle of operation of the present invention is concerned which of the assemblies is selected for mounting the sway bar 19, nevertheless, for the purpose of illustrating the present invention, I have shown the bar 19 as mounted on the sprung assembly 10 and as having the extremities of the arms 21 directly pivotally connected to the unsprung assembly 11 or axle 14 of the vehicle.

Figure 2:
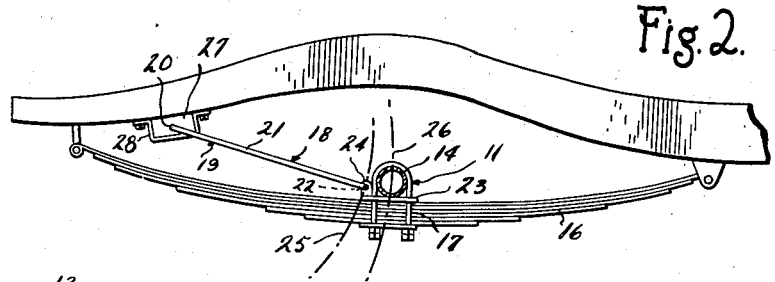
Figure 2 is a side elevational view of a portion of the construction shown in Figure 1.

In detail, the base section 20 of the U-shaped bar 19 extends transversely of the frame 12 beneath the latter and the opposite ends of the base section 20 are respectively mounted on the laterally spaced sills of the frame for rocking movement. The arms 21 of the U-shaped bar extend longitudinally of the chassis in a direction toward the axle 14 and terminate in inwardly extending portions 22. The portions 22 extend substantially parallel to the base section 20 of the bar and are respectively pivotally connected to plates 23 clamped to the axle 14 by the U-bolts 17. The plates are shown in Figure 2 as having upwardly extending ears 24 provided with openings therethrough for pivotally receiving the extensions or portions 22 on the arms 21. Thus, it will be seen that the extremities of the arms on the torsion bar 19 are directly pivotally connected to the unsprung assembly, with the result that the usual linkage, heretofore considered necessary for the above purpose, and the attendant disadvantages of these links are eliminated with the present invention.

Upon reference to Figure 2, it will be noted that upon spring deflection, the extremities 22 of the arms tend to travel in a path substantially indicated by the dotted line 25, while the axle 14 is compelled to move throughout the path indicated generally by the dot-and-dash line 26. The two paths of travel are different and, since the extremities 22 of the stabilizer 19 must move with the axle upon spring deflection, it follows that some provision should be made to compensate for the variation between the two paths of travel. This is accomplished, in the present instance, by mounting the opposite end portions of the base section 20 of the bar in blocks 27 of resilient material permitting the required shifting movement of the torsion bar relative to the frame to compensate for the variations in the paths of travel referred to above. In the present instance, the blocks 27 are preferably formed of rubber and are respectively secured to the undersides of the laterally spaced side sills of the frame 12 by means of metal retainers or straps 28. Each of the blocks 27 is formed with an opening 29 therethrough for receiving the extremities of the base section 19 of the U-shaped bar. If desired, the openings 29 may be made slightly smaller than the diameter of the bar so as to have a gripping action against the bar and, in cases of this character, both the rocking and shifting movements of the bar are permitted, by interparticle flow of the resilient material from which the blocks are formed.

Figures 3, 4:
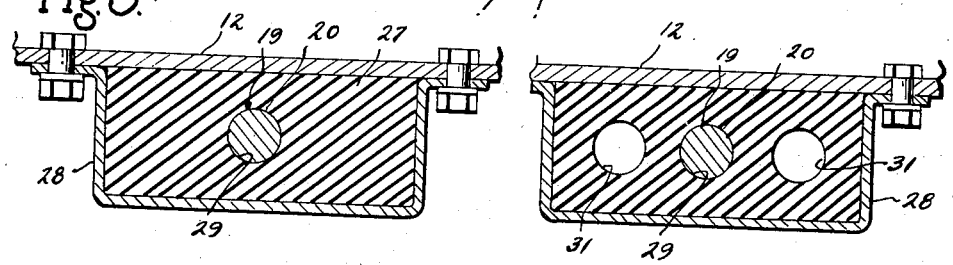
Figure 3 is a sectional view taken substantially on the plane indicated by the line 3—3 of Figure 2.
Figure 4 is a sectional view similar to Figure 3 showing a slightly modified form of construction.
Figure 5:
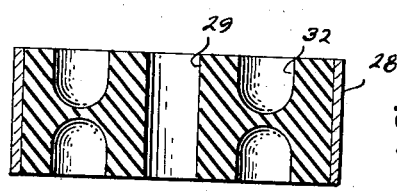
Figure 5 is a horizontal sectional view through another embodiment of this invention.

In the event it is desirable to increase the flow characteristics of the rubber blocks to insure obtaining the required shifting movement of the stabilizer bar during spring deflection, the blocks may be formed with one or more openings 31 therethrough located in the manner illustrated in Figure 4. The openings 31 are shown in Figure 4 as extending entirely through the blocks but it is to be understood that the desired results may be secured by merely recessing the blocks in the manner designated by the reference character 32 in Figure 5. It is possible to secure the desired movements of the sway bar relative to the frame in various other ways not specifically shown herein and reservation is made to make such changes in the construction as may come within the purview of the accompanying claims.

With the foregoing construction, it will be noted that relative movement between the sprung and unsprung assemblies at one side of the vehicle will be transmitted through the spring bar 19 tending to effect a similar relative movement between these assemblies at the opposite side of the vehicle. In other words, as the suspension means at one side of the vehicle tends to deflect relative to the suspension means at the opposite side of the vehicle, the latter suspension means will react through the latter spring bar to resist deflection of the former suspension means. This has the effect of maintaining the normal plane of the body of the vehicle substantially parallel with the plane of the axle when the vehicle is turned in either direction from a straight line course of travel. It will, of course, be understood that the torsion bar 19 does not effect a rigid connection between the opposite sides of the sprung and unsprung assemblies, since such an arrangement would have the tendency to effect an exceedingly rough ride. As a matter of fact, the dimension of the bar 19 is so selected as to permit the same to wrap or twist to a certain extent upon relative deflection of the suspension means on opposite sides of the vehicle.

What I claim as my invention is:

1. In a vehicle having sprung and unsprung assemblies, a stabilizer comprising a bar extending transversely of one of the assemblies and having arms extending laterally from the bar and directly pivotally connected to the other assembly, and blocks of resilient material mounting the bar on said one assembly for both rocking and shifting movement relative to the latter assembly.

2. In a vehicle having sprung and unsprung assemblies, a stabilizer comprising a one-piece substantially U-shaped bar having the base section extending transversely of one of the assemblies and having the extremities of the arms directly pivotally connected to the other assembly, and blocks of resilient material mounting the opposite end portions of the base section of the bar on said one assembly for both rocking and shifting movement relative to the latter assembly.

3. In a vehicle having sprung and unsprung assemblies, a stabilizer comprising a bar extending transversely of one of the assemblies and having arms connected to the other assembly, and resilient blocks mounting the bar on said one assembly, said blocks having recesses therein for permitting rocking and shifting movement of the bar by interparticle flow of the resilient material.

4. In a vehicle having sprung and unsprung assemblies, a stabilizer bar rockably supported on one of the assemblies and having laterally extending arms directly pivotally connected to the other assembly, the point of pivotal connection of the arms with the latter assembly being restrained to move along a path different from the path along which the ends of the arms tend to move upon rocking movement of the bar, and resilient blocks mounting the bar on said one assembly allowing the shifting movement of the bar required to permit the ends of the arms to move in the path of travel of the point of pivotal connection of the arms with said other assembly.

5. In a vehicle having sprung and unsprung assemblies, a stabilizer comprising a bar extending transversely of one of the assemblies, members of rubber material mounting the bar on the latter assembly for rocking movement and for limited shifting movement fore and aft of said assembly, arms extending transversely of the bar in spaced relation axially of the bar and movable as a unit with said bar, and means directly pivotally connecting the free ends of the arms to the other assembly.

6. In a vehicle having sprung and unsprung assemblies, a stabilizer comprising a torsion bar having laterally extending arms spaced from each other in the direction of length of the bar, mounting means for supporting the bar on one of the assemblies for rocking movement, and mounting means directly connecting the free end portions of the arms on the bar to the other assembly, one of said mounting means including members of resilient material providing for relative movement between the bar and latter assembly by interparticle flow of the resilient material.

7. In a vehicle having sprung and unsprung assemblies, a stabilizer comprising a torsion bar having laterally extending arms spaced from each other in the direction of length of the bar, mounting means for supporting the bar on one of the assemblies for rocking movement, additional mounting means directly connecting the free ends of the arms to the other assembly, the free ends of the arms and the unsprung assembly having different paths of travel, and one of said mounting means comprising blocks of rubber material deformable to compensate for the different paths of travel aforesaid.

BROUWER D. McINTYRE.